US 6,537,149 B2

(12) United States Patent
Sogabe (10) Patent No.: US 6,537,149 B2
(45) Date of Patent: Mar. 25, 2003

(54) GAME SYSTEM AND COMPUTER READABLE STORAGE MEDIUM FOR BREEDING GAME

(75) Inventor: Daisuke Sogabe, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/768,491

(22) Filed: Jan. 24, 2001

(65) Prior Publication Data

US 2001/0011034 A1 Aug. 2, 2001

(30) Foreign Application Priority Data

Jan. 31, 2000 (JP) ...................................... 2000-027326

(51) Int. Cl.$^7$ ................................................ A63F 13/00
(52) U.S. Cl. ................................................ 463/1; 463/9
(58) Field of Search ........................... 463/1, 9; 273/246

(56) References Cited

U.S. PATENT DOCUMENTS

| | | | | | |
|---|---|---|---|---|---|
| 3,883,143 A | * | 5/1975 | Kelley et al. | ............... | 273/134 |
| 4,874,177 A | * | 10/1989 | Giradin | ............... | 273/246 |
| 5,106,098 A | * | 4/1992 | Filiczkowski | ............... | 273/246 |
| 5,411,258 A | * | 5/1995 | Wilson et al. | ............ | 273/86 B |
| 5,551,699 A | * | 9/1996 | Pavelich | ............... | 273/246 |
| RE35,819 E | * | 6/1998 | Suzuki | ............... | 463/6 |
| 5,816,913 A | | 10/1998 | Nakamura | | |
| 5,976,015 A | * | 11/1999 | Seelig et al. | ................... | 463/6 |
| 5,984,785 A | * | 11/1999 | Takeda et al. | ................ | 463/38 |
| 6,210,275 B1 | * | 4/2001 | Olsen | ........................ | 463/16 |

FOREIGN PATENT DOCUMENTS

| JP | 10165644 | 6/1998 |
|---|---|---|
| JP | 2000288246 | 10/2000 |
| JP | 2000300850 | 10/2000 |

OTHER PUBLICATIONS

Gallop Racer Game Manual, 1999, Tecmo/Sony Playstation, pp. 1–30.*
Gallop Racer. Game Overview [Online]. www.freecoupons.com[Retrieved 2001–08–16]. Retrieved from the Internet:<URL:http://www.couponsfreecoupons.com/sony/play/gallop_racer.htm>.*
Gallop Racer. Game Review [Online]. Tecmo, Inc. [Retrieved 2001–08–16]. Retrieved from the Internet <URL:http://www.tecmoinc.com/gallop.htm>.*
Gallop Racer. Game Advertisement [Online]. scea.com. [Retrieved 2001–08–16]. Retrieved from the Internet <URL:http://www.scea.com/games/racing_game.asp>.*
Gallop Racer. Game Tips. [Online]. Jill Fazio. [Retrieved 2001–08–16]. Retrieved from the Internet <URL:http://db.gamefaqs.com/console/psx/file/gallop$_{13}$ racer.txt>.*
Chocobo Racing. Game Article. [Online]. psx.ign.[Retrieved 2001–08–16]. Retrieved from the Internet <URL:http://psx.ign.com/reviews/11439.html>.*

(List continued on next page.)

Primary Examiner—Valencia Martin-Wallace
Assistant Examiner—Scott E. Jones
(74) Attorney, Agent, or Firm—Jordan & Hamburg LLP (57) ABSTRACT

A game system includes: a display device for displaying images; an input device for receiving manipulation by a user and for outputting a signal corresponding to the manipulation; and a control device for controlling progress of a horse breeding game with monitoring the signal outputted from the input device and displaying images corresponding to the progress of the game on a screen of the display device. The control device includes: an evaluation value storage unit for storing evaluation values for a plurality of sires; a control unit for controlling the progress of the game based on the evaluation values; and an evaluation value updating unit for updating the evaluation values for the sires in every predetermined period during the progress of the game.

14 Claims, 7 Drawing Sheets

OTHER PUBLICATIONS

Kutan the Moople's Chocobo Racing Page. Game Tips. [Online]. ktaggart [Retrieved 2001-08-16]. Retrieved from the Internet <URL:http://home.inreach.com/ktaggert/>.*

Chocobo Racing. Release Dates. [Online]. psx.ign. [Retrieved 2001-08-16]. Retrieved from the Internet <URL:http://pst.ign.com/games/11439.html>.*

"A Sure Method of Winning Games–Special, Turf Wind ', Official Guidebook First Edition, Truf Wind '96," pp. 16, 17 and 44 (Jun. 26, 2001), *(*Translations of relevant portions).

* cited by examiner

| <SIRE LIST> | | |
|---|---|---|
| Sire Name | Mating Fee | Tendency |
| OSAICHI GEORGE | 300,000 | ↓ |
| THRUODINA | 300,000 | ↘ |
| SAKURA ROTARY | 300,000 | ↑ |
| SUZUKAKOBAN | 300,000 | ↗ |
| THRU THE DRAGON | BOOKFULL | → |
| NO-PASS NO-SALE | 200,000 | ↓ |
| PADSULE | 200,000 | ↘ |
| REFERS SPECIAL | 200,000 | ↑ |
| LANDHIRYU | BOOKFULL | ↗ |
| MUCTOR | 200,000 | → |

GAME SYSTEM AND COMPUTER READABLE STORAGE MEDIUM FOR BREEDING GAME

BACKGROUND OF THE INVENTION

1. Field of the Invention

The present invention relates to a technique of evaluating sire (stallion) in a computer game in which a user breeds race horses.

2. Description of the Prior Art

There is known a simulation game in which a user hypothetically experiences a horse owner and breeds racehorses. In such a game, a user selects his or her favorite horses (especially sire), breeds race horses, and make the horses run races. Since basic ability of a newborn horse depends on how to select the sire and the breeding mare, the user considers various matters to determine the sire and the breeding mare so that a strong race horse is born. Thus, the user can hypothetically experience the pleasure of the horse owner in producing strong horses from the sires and the breeding mares of his or her choice.

In such a race-horse breeding game, plural sires are prepared, in advance, at the beginning of the game. Normally, the mating fee required to mate a sire with a breeding mare is set more expensive as the ability of the sire is high.

However, in the conventional game, the mating fees for the sires were fixed, and therefore the user is inclined to frequently select only several high-ability sires for which the mating fee is high. Thus, breeding the race-horses in the game becomes unthinking and monotonous.

SUMMARY OF THE INVENTION

It is an object of the present invention to provide a game system capable of enhancing the user's enjoyment in a race-horse breeding game by introducing more actual evaluation method for varying the evaluation of sires.

It is another object of the present invention to provide a computer-readable storage medium carrying program therefor.

According to one aspect of the present invention, there is provided a game system including: a display device for displaying images; an input device for receiving manipulation by a user and for outputting a signal corresponding to the manipulation; and a control device for controlling progress of a horse breeding game with monitoring the signal outputted from the input device and displaying images corresponding to the progress of the game on a screen of the display device, the control device including: an evaluation value storage unit for storing evaluation values for a plurality of sires; a control unit for controlling the progress of the game based on the evaluation values; and an evaluation value updating unit for updating the evaluation values for the sires in every predetermined period during the progress of the game.

In accordance with the game system thus configured, the evaluation values stored for plural sires are updated in a predetermined period during the progress of the game. Therefore, the progress of the game is not monotonous, and the variation of the game play may be broadened.

The control device may further include a mating fee determining unit for determining a mating fee for each sire based on the updated evaluation value; and a sire list producing unit for producing a sire list including indication of the mating fees for all sires determined by the mating fee determining unit and for displaying the sire list on the display device. By this, the mating fee is determined based on the updated evaluation values, and then the sire list is produced which indicates the mating fees thus determined for all sires. Since the mating fee varies in every predetermined period in the game, the user may have broad choice, thus increasing the pleasure of the user in selecting the sire.

The control device may further include a sire designating unit for receiving a designation of the sire by the user; a child horse ability determining unit for determining a basic ability value of a child horse based on pedigree data of the sire designated by the sire designating unit; and a child horse ability correcting unit for correcting the basic ability value of the child horse for the designated sire based on variation amount of the updated evaluation value.

In accordance with the above configuration, first the basic ability value of the child horse is determined based on the pedigree data of the selected sire. Then, based on the variation amount of the updated evaluation value of the sire, the basic ability value of the child horse is corrected. Therefore, not only the pedigree data but also the sire's ability at that time is reflected to the ability value of the child horse. Thus, the user can know the variation condition of the sire evaluation value to produce stronger horses.

The evaluation value updating unit may update the evaluation value by adding a predetermined reference value for the sire to a correction value generated using a random number. Thus, the evaluation values of the sires are evenly updated.

The correction value may be determined by arithmetically operating a variation range value and a variation probability value predetermined for the sire and the random number. Hence, by determining the variation range value and the variation probability value differently, the variation of the sire ability may be peculiarly characterized.

The control device may further include a race result data storage unit for storing race result data of the child horse for each sire, and the evaluation value updating unit may update the evaluation value of the sire based on the race result data of the child horse. By this, the evaluation of the sire is improved if the race result of the child horse for the sire is improved. This enables more realistic evaluation of the sires.

The control device may further include a variation tendency determining unit for determining variation tendency of the evaluation value for each sire based on the variation amount of the evaluation value caused by the updating, and the sire list producing unit may produce the sire list which represents sire names, the mating fees and the variation tendency of the evaluation value in an order sorted in terms of the mating fee. Therefore, the user can know the mating fees and the variation of the sire's evaluation from the sire list. Namely, the user can obtain, from the sire list, useful information in selecting sire.

The child horse ability correcting unit may correct the ability by increasing the ability of the child horse if the variation amount of the evaluation value is positive and decreasing the ability of the child horse if the variation amount of the evaluation value is negative. By this, the sire in good condition produces strong child horses with high probability, and sire in bad condition produces strong child horses with low probability. Thus, the condition and/or tendency of the sire at each time may be reflected to the ability of the child horse.

The control device may further include a stability storage unit for storing a predetermined stability for each sire, and the child horse ability correcting unit may correct the ability of the child horse such that the ability of the child horse largely depends upon the variation amount of the evaluation value if the stability of the selected sire is high and the ability of the child horse less depends upon the variation amount of the evaluation value if the stability of the selected sire is low. Thus, by selecting the sire in consideration of the stability, it is possible to predict or presume the influence of the sire to its child horse, thereby increasing the pleasure of thinking in the selection of the sire.

According to another aspect of the present invention, there is provided a computer readable storage medium for carrying a program for controlling progress of a horse breeding game with monitoring the signal outputted from an input device of a game system and displaying images corresponding to the progress of the game on a screen of the display device, the program controls the game system to function as: an evaluation value storage unit for storing evaluation values for a plurality of sires; a control unit for controlling the progress of the game based on the evaluation values; and an evaluation value updating unit for updating the evaluation values for the sires in every predetermined period during the progress of the game.

In accordance with the storage medium, when it is read out and executed by the computer, the computer may function as a control device in the game system of the present invention. It is noted that the storage medium may include a magnetic storage medium, an optical storage medium, a magneto-optical storage medium, a semiconductor storage elements and other various storage means.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

[1] Terms and Premises

First of all, basic matters and concepts relating to race-horses and the progress of the game in the race-horse breeding game will be described below.

The race-horse breeding game of the present invention progresses in such a manner that the user, who is an owner of horses, inputs various selection and instruction, and the game system produces race-horses from the sires and mares selected by the user, breeds them and make them run the races. If desired, the user can use the race-horses produced by himself or herself as a sire or a breeding mare, and eventually the user can produce sires. In such a game, the present invention particularly relates to "race-horse breeding process" in which the user selects sires and breeding mares to breed race-horses.

Throughout the specification, the following terms will be used. "Race-horse" is a horse that runs horse races. The horse-race breeding game is mainly designed to produce newborn horses from parents (i.e., father horse and mother mare), and making a new horse is called "(race-) horse breeding". A mother mare used for mating is called "breeding mare", and a father horse used for mating is called "(breeding) sire". The activity to produce a horse from a sire and a breeding mare is called "mating", and a newborn horse is called "child horse".

Normally, the mating is executed in the game after the user selects a breeding mare and a breeding sire. The fee that the horse owner pays for the mating is called "mating fee".

In the race-horse breeding game according to the present invention, the user hypothetically experiences the horse owner (and therefore a breeder) and selects breeding horses for mating. At that time, the user generally selects a breeding sire from a predetermined sire list, and mates the selected breeding sire with a breeding mare that he or she owns. The sire list includes a plurality of sire names and the mating fees for those sires. Normally, the mating fee is set expensive for the sires which have high ability as sire (i.e., have high possibility of producing strong horses). In this view, the mating fee may be an index of the sire's ability.

In the present embodiment, the sires included in the sire list can be classified into two kinds. The sires of one kind are "pre-existing sires" which are prepared by the game producer side. The sires of another kind are "user-made sires" which are produced by the user, run the races and then become sires after their retirement in the course of the game progress.

The user can make the horses that he or she produced run the race. If the horse runs the race, prize money is paid to the horse owner according to the race result, and the amount of the prize money is regarded as one evaluation factor of the ability of the child horse as a race-horse. Namely, a race-horse which earned much prize money is evaluated as an excellent race-horse.

For the data processing in the game, the ability evaluation of the sire is represented as a parameter "sire evaluation value". In addition, as other parameters associated with the evaluation of the sire, "earning index" and "stability" are prepared. The "earning index" represents the prize earning efficiency of the child horse produced from the sire, and is an index representing probability that the sire produces strong child horse. The sire evaluation value is based on the earning index, and is obtained by further taking variable factors described later into account. Basically, the higher the earning index value is, the higher the ability of the sire is and the higher the probability that an excellent child horse is born. The "stability" is an index representing the probability that the ability of the sire is inherited to its child horse. In this embodiment, the breeding mare does not have the earning index as a parameter representing its ability, and has only the parameter "stability".

[2] Configuration of Game System

Figure 1:
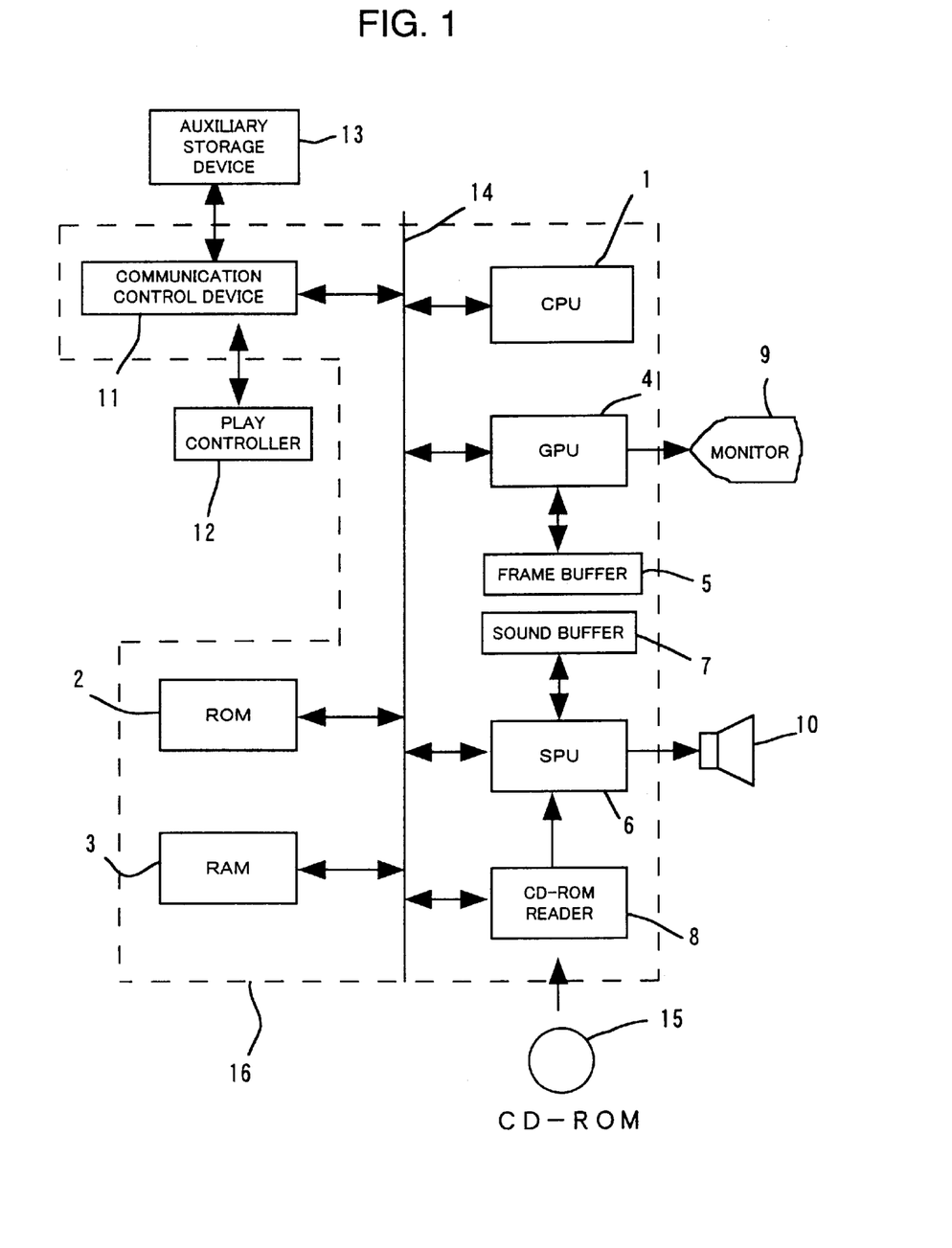
FIG. 1 is a block diagram showing a system configuration of a race horse breeding game according to the present invention.

FIG. 1 is a block diagram showing a control unit of the race-horse breeding game system according to the present invention. This game system executes the game according to the game program recorded on the CD-ROM 15 serving as a storage medium.

The game system mainly configured by a game device 16, which includes a CPU 1 mainly configured by a microprocessor, a ROM 2 and a RAM 3 serving as main memory devices for the CPU 1, a graphics processing unit (GPU) 104 and a sound processing unit (SPU) 6 for executing processing required to output visual images and sound, buffers 5 and 7 for the above units 4 and 6, and a CD-ROM reader 8. The ROM 2 stores operating system which functions as necessary program for the overall control of the game device 16. Game programs and data read out from the CD-ROM 15 is written into the RAM 3 as necessary. The GPU 4 receives picture data from the CPU 1 and writes it into the frame buffer 5, converts the picture data to a video signal and outputs it to the monitor 9 at appropriate timings. The SPU 6 reproduces voice and music data as well as music-source data, which are read out from the CD-ROM 15 and stored in the sound buffer 7, so that corresponding sound is outputted by the speaker 10. The CD-ROM reader 8 reads out necessary programs and data from the CD-ROM 15 according to the instruction by the CPU 1, and outputs signals corresponding to the programs and data thus read out. The CD-ROM 15 stores programs and data necessary for the execution of the game. Generally, a television receiver for home use is used as the monitor 9, and a loudspeaker provided in the television receiver is used as the loudspeaker 10.

Moreover, a communications control device 11 is connected via a bus 14 to the CPU 1, and a play controller 12 and the auxiliary storage device 13 are detachably connected to the CPU 1 via the communication control device 11. The play controller 12 functions as an input device manipulated by a user who plays the game. The play controller 12 includes operation members which are to be manipulated by the user. The communications control device 11 scans the state of the operation members of the play controller 12 at a fixed cycle (e.g. 1/60 second), and outputs signals in correspondence with the scanning result to the CPU 1. Based on that signal, the CPU 1 judges the state of the play controller 12. A plurality of controllers 12 and auxiliary storage units 13 may be connected to the communication control device 11 in parallel, at the same time. Various kinds of devices may be used as the play controller 12.

With the above-described configuration, the components other than the monitor 9, the speaker 10, the play controller 12, the CD-ROM 15 and the auxiliary storage unit 13 are all accommodated in a single housing to constitute the home game device 16.

The race-horse breeding game system according to the present invention progresses with the CPU 1 monitoring the selection and/or instruction input by the user via the play controller 12 and executing the following process based on the game program stored in the CD-ROM 15 serving as a storage medium.

[3] Horse Breeding Process

Next, the description will be given of an outline of the horse breeding process according to an embodiment of the race-horse breeding game system of the invention.

The horse breeding process is a part to which the present invention particularly relates, and includes data updating process and main breeding process. The data updating process is executed once at the beginning of a year in the progress of the game to update the sire evaluation values of the respective sires. This process is automatically executed mainly by the game system side. On the other hand, the main breeding process generally proceeds to perform mating by the sire designated by the user and then determine the ability of a newborn horse. Therefore, the main breeding process is executed by referring to the user's inputs during the mating season in the progress of the game.

Figure 2A:
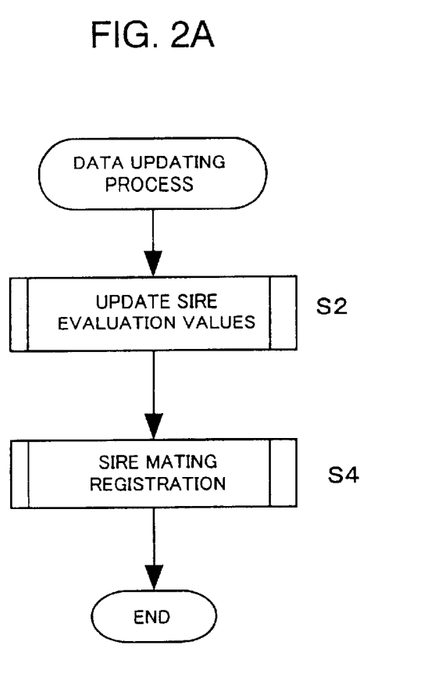
FIG. 2A is a flowchart showing data updating process in a horse breeding process.
Figure 2B:
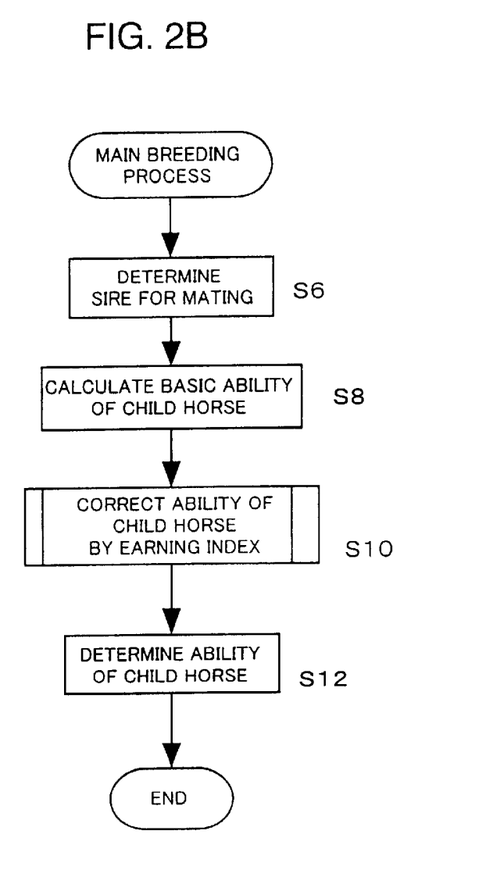
FIG. 2B is a flowchart showing main breeding process in the horse breeding process.

The outline of the horse breeding process will be described with reference to the flowcharts in FIGS. 2A and 2B. FIG. 2A shows the data updating process and FIG. 2B shows the main breeding process.

Figure 3:
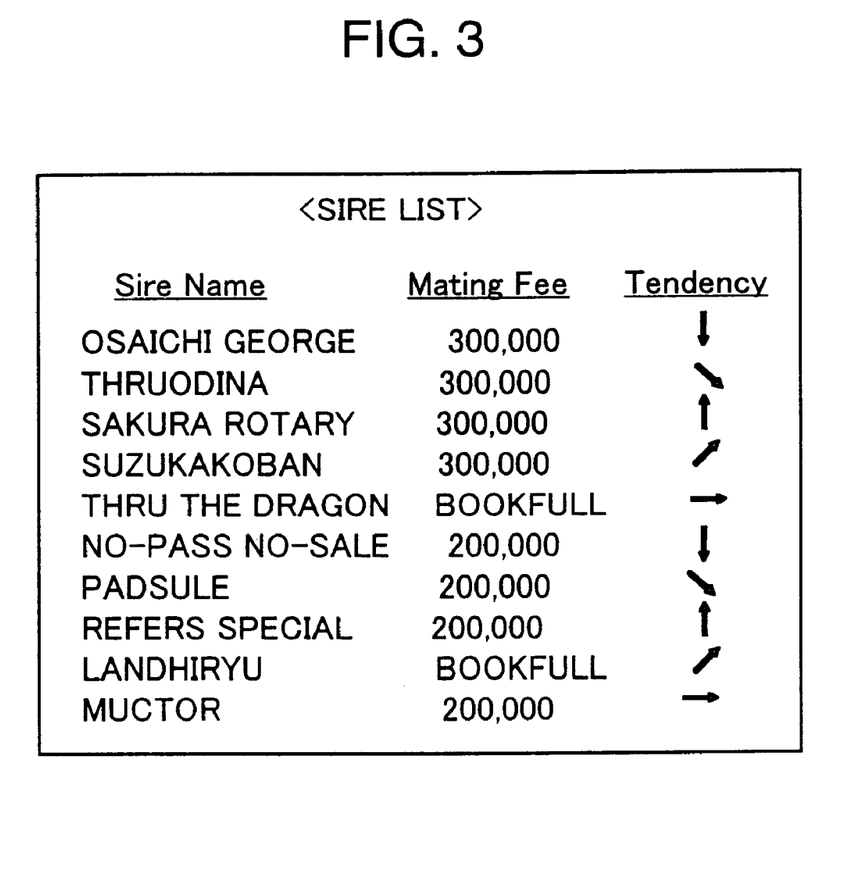
FIG. 3 is a diagram showing an example of a sire list.

In the data updating process, first the sire evaluation values are updated for all sires set in the game (step S2). Then, the sire mating registration process is executed (step S4). Namely, the mating fees are determined based on the sire evaluation values of the sires thus updated, and the sire list is produced. Thus, the data updating process ends. FIG. 3 shows an example of the sire list. As shown in FIG. 3, the sire list shows the mating fee for each sire. The arrows at the right end of the sire list shows the tendency of the mating fee variation compared with the previous year, and this will be described later in more detail.

Next, the main breeding process will be described. First, the user determines the sire (step S6). Namely, the user sees the sire list and selects the sire for mating. Normally, the user is a horse owner in the game, and determines breeding mare to be mated with the sire from the mares that he or she owns.

If the sire and the breeding mare are thus determined, the basic ability value of the child horse is calculated based on the data associated with the ability of the sire and the breeding mare (step S8). Specifically, first the basic ability value of the child horse is determined based on the stability of the sire and the breeding mare. Then, the basic ability value is corrected based on the respective pedigree data of the sire and the breeding mare, in consideration of the backgrounds and/or the affinity of the sire and the breeding mare in terms of those pedigrees.

Subsequently, the basic ability value of the child horse thus corrected is further corrected by using the earning index (step S10). This will be described later in detail. Thus, the racing ability value of the child horse is determined (step S12), and the main breeding process ends.

[4] Sire Evaluation Value Updating Process

Next, the detailed description will be given of the sire evaluation value updating process corresponding to step S2 in FIG. 2A.

Updating the sire evaluation value is executed for all sires, but the updating methods for the pre-existing sires and the user-made sires are different from each other. For the pre-existing sires, the sire evaluation values are updated by using three parameters: "basic earning index value", "amplitude" and "variation probability". These three parameters are given to the respective pre-existing sires in advance, and are not varied in principle during the progress of the game. The "basic earning index value" represents the basic ability as a sire, and the higher value basically means higher ability. The ability of the sire slightly varies year by year. The "amplitude" represents the variation range of the ability as a sire, and the sire having larger amplitude has larger variation range of its ability. The "variation probability" represents the probability that the sire's ability varies. The sire having lower variation probability value has less possibility of the ability variation.

Figure 4A:
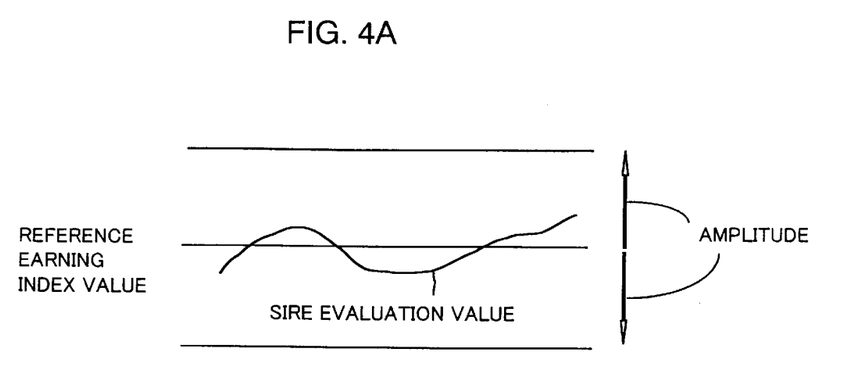
FIG. 4A is a schematic diagram showing relation between an earning index and a sire evaluation value.

FIG. 4A schematically shows the relation between the three parameters: the basic earning index value, the amplitude and the variation probability. The sire evaluation value is updated by varying the basic earning index value by a correction value which is obtained by the arithmetic operation of the amplitude, the variation probability and a certain random number α. Specifically, first the random number α is generated, and then the variable X is calculated as follows:

$$(\text{Variable } X) = \text{random number } \alpha + \text{Variation probability value} \quad (1)$$

Then, using the variable X, the amplitude correction rate is obtained as follows:

$$\begin{aligned}(\text{Amplitude correction rate}) &= 1.0 & (X > 180) \quad (2)\\ &= 1.0 - \sin(X \times \pi/180) & (X > 90)\\ &= \sin*(X \times \pi/180) - 1.0 & (X \leq 90)\end{aligned}$$

Then, the amplitude correction value is obtained from the amplitude and the amplitude correction rate as follows:

$$(\text{Amplitude correction value}) = \text{Amplitude} \times \text{Amplitude correction rate} \quad (3)$$

Then, the sire evaluation value is obtained from the following equation:

$$(\text{Sire evaluation value}) = \text{Basic earning index value} + \text{Amplitude correction value} \quad (4)$$

Therefore, the sire evaluation value of the pre-existing sire randomly varies every year based on the basic earning index value.

On the other hand, for the user-made sire, the earning index value is updated by the calculation based on the race results of the child horses produced from the sire in the previous year. The calculation equation for the earning index value is as follows:

$$\text{EARNING INDEX VALUE} = \frac{\text{TOTAL PRIZE OF CHILD HORSES}}{\text{NUMBER OF CHILD RACE HORSES}} \div \frac{\text{TOTAL PRIZE FOR ALL HORSES}}{\text{NUMBER OF RACING HORSES}} \quad (5)$$

$$(\text{RACE NUMBER} \times 5)$$

Namely, the earning index value obtained by the equation (5) represents the prize money earning efficiency of the sire in the previous year, and serves as a factor showing whether the sire produced excellent child horses or not.

Figure 5:
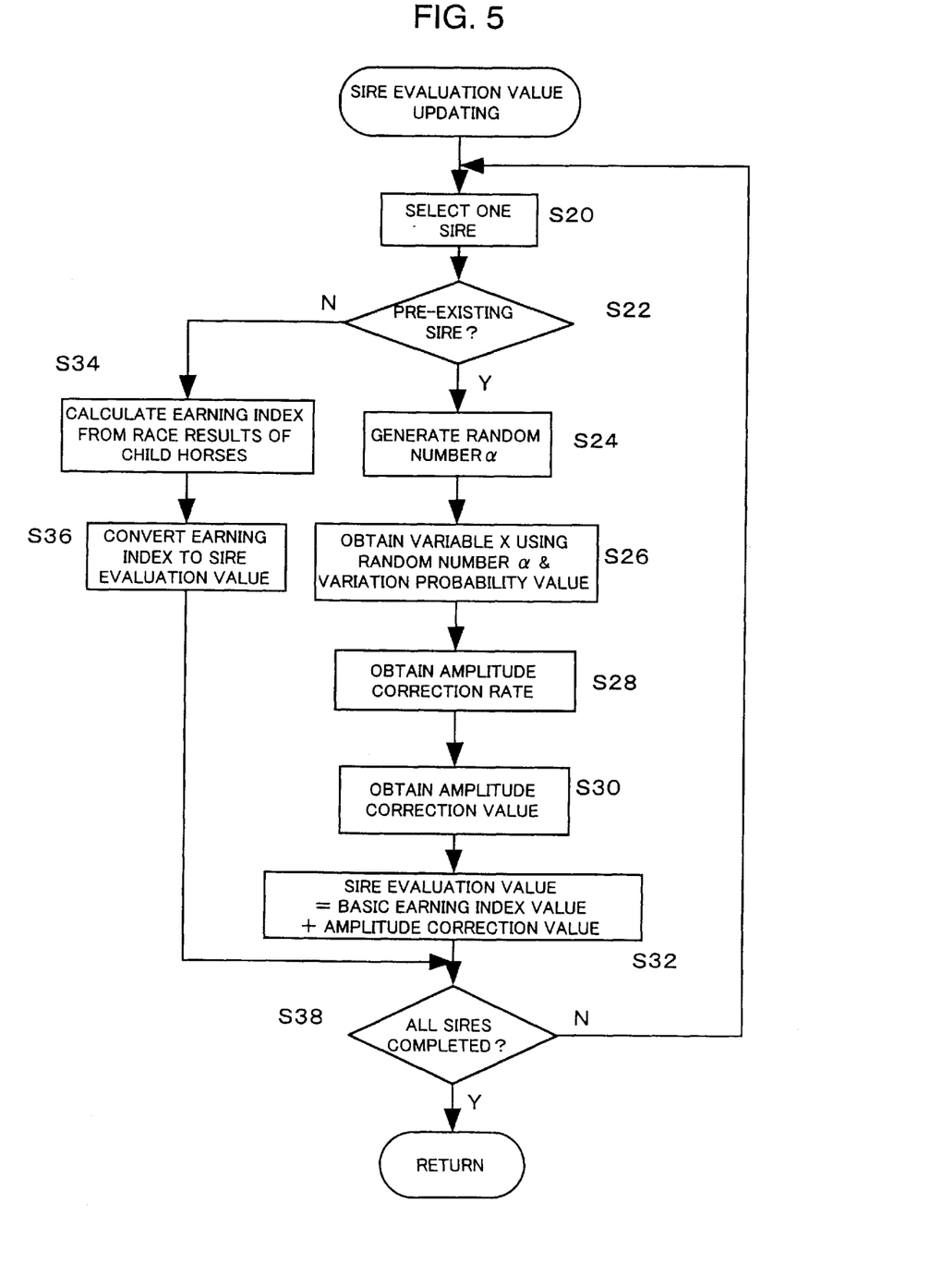
FIG. 5 is a flowchart showing sire evaluation value updating step shown in FIG. 2A.

Next, the sire evaluation value updating process corresponding to step S2 in FIG. 2A will be described with reference to the flowchart of FIG. 5. First, one of the plurality of sires is selected (step S20), and it is determined whether or not the sire is pre-existing sire (step S22). If it is a pre-existing sire (step S22; Yes), a certain random number α is generated (step S24). Then, by using the random number α and the variation probability value of the sire, the variable X is obtained from the equation (1) (step S26). The variable X represents the variation rate for the updating in that year. Then, by using the variable X thus obtained and the amplitude of the sire, the amplitude correction rate is obtained (step S28). Then, according to the equation (3), the amplitude, indicating the maximum variation range of that sire's ability, is multiplied by the amplitude correction rate to obtain the variation for that year as the amplitude correction value (step S30). Then, according to the equation (4), the amplitude correction value is added to the basic earning index value of the sire to obtain the sire evaluation value (step S32). Therefore, when the random number α is a positive number, the sire evaluation value is larger than the basic earning index value, indicating that the evaluation of the sire is being improved. On the other hand, when the random number α is a negative value, the sire evaluation value is smaller than the basic earning index value, indicating that the evaluation of the sire is getting down. Thus, the sire evaluation value of the pre-existing sire randomly varies year by year. FIG. 4A shows an example of such variation.

On the other hand, if the sire selected in step S20 is a user-made sire (step S22: No), the earning index value is calculated based on the equation (5) using the race results in the previous year of the child horses of the sire (step S34), and the earning index value thus obtained is converted to a sire evaluation value in a manner to keep the balance with the sire evaluation values of the pre-existing sires (step S36). Therefore, the sire evaluation value of the user-made sire varies every year based on the race results of the child horses in the previous year. This is a kind of realistic evaluation method.

When the updating the sire evaluation value for one sire is thus completed, it is determined if the updating is completed for all sires (step S38), and if not, the process returns to step S20 to repeat the above steps. When the updating is completed for all sires, the process returns to the data updating process shown in FIG. 2A. In this way, the sire evaluation values are updated for all sires.

It is noted that the updating methods for the pre-existing sires and the user-made sires are determined differently from each other for the following reason. Since the user-made sire is made to be the sire by the decision of the user, normally the user uses the user-made sire for the mating in later stage of the game and its child horse is produced. Thus, the race result data exists for child horses of the user-made sires, and the earning index value may be calculated for the user-made sires using the equation (5). However, since the pre-existing sires are prepared, in advance, by the game producer side, it is likely that the pre-existing sire is not used for the mating if the user is not interested in that sire, and there is no race result data for the child horses of the pre-existing sire in that case. Therefore, it is not necessarily possible to calculate the earning index value for all pre-existing sires from the equation (5). For this reason, for the pre-existing sires, the sire evaluation values are updated, every year, by varying the predetermined basic earning index values by using a random number.

[5] Sire Mating Registration

Figure 6:
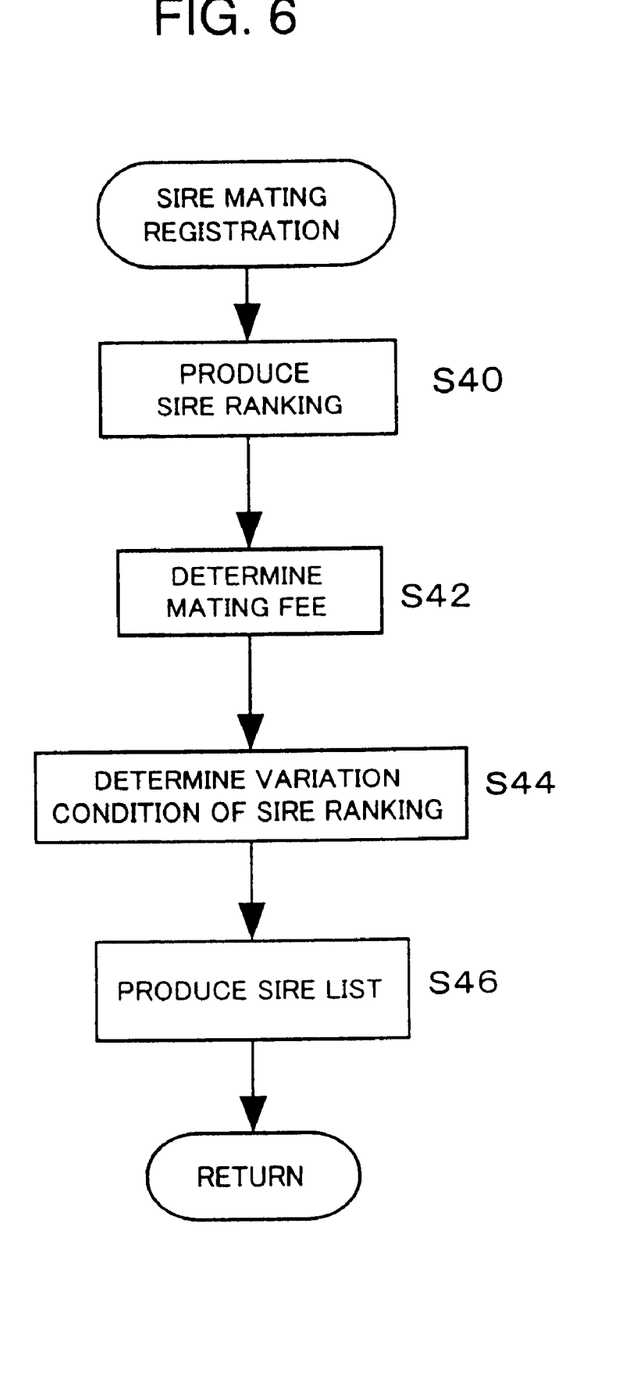
FIG. 6 is a flowchart showing sire mating registration step shown in FIG. 2A.

Next, the description will be given of the sire mating registration process corresponding to step S4 in FIG. 2A, by referring to the flowchart in FIG. 6. The sire mating registration process determines the sire ranking based on the sire evaluation values updated by the data evaluation value updating process, thereby to update the sire list.

First of all, all sires are sorted in terms of the updated sire evaluation values to produce the sire ranking (step S40). Then, by referring to a predetermined correspondence table between the sire ranking and the mating fee, the mating fees are determined for all sires (step S42). Then, the variation of the ranking from the ranking in the previous year is calculated for each sire (step S44). Then, the mating fees thus calculated is stored for each sire to produce the sire list (step S46).

The sire list thus produced represents the mating fee for each sire as shown in FIG. 3. In addition, the variation tendency of the ranking for each sire, obtained in step S44, are shown in the sire list in the form of the arrows on the right end. In the example shown in FIG. 3, the variation tendency of the ranking is classified into 5 levels, which are expressed by arrows of 5 different directions. For example, the upward arrow means the ranking increase for more than 5 ranks, the right-upward arrow means the ranking increase for 1 to 4 ranks, the right arrow means no ranking change, the right-downward arrow means the ranking decrease for 1 to 4 ranks, and the downward arrow means the ranking decrease for more than 5 ranks. Further, the color of the arrow (not shown in figures) represents the variation of the sire evaluation value with respect to the basic earning index value for each sire. For example, a blue arrow is shown if the sire evaluation value is equal to or higher than the basic earning index value, and a red arrow is shown if the sire evaluation value is lower than the basic earning index value.

By way of example, for a sire which has the basic earning index value 150, the present sire evaluation value 140 and the sire evaluation value 90 in the previous year, an upward and red arrow is shown. For a sire which has the basic earning index value 150, the present sire evaluation value 160 and the sire evaluation value 210 in the previous year, a downward and blue arrow is shown. Thus, the user can judge the present variation condition of the sire evaluation value and tendency for each sire from the direction of the arrows, and judge the present level of the sire in comparison with the native ability of the sire from the color of the arrows.

Alternatively or additionally to this, the ability variation condition may be given to the user by the game system in a form of an audible or visible message such as "This sire is doing well these days". Thereafter, the process returns to the process of FIG. 2A.

[6] Ability Correction of Child Horses using Earning Index

Next, the description will be given of the ability correction of child horses using the earning index, corresponding to step S10 in FIG. 2B. This process corrects the basic ability value of the child horse obtained in step S8 in FIG. 2B by using the earning index value of its sire. Specifically, an influence occurring probability and an influence value of a degree of strong-horse production is obtained based on the variation of the sire evaluation values calculated in step S2 and the stability of sire mated, and then the ability of the child horse is corrected using those factors. Here, if "there is an influence by the degree of strong horse production", it means that the ability of sire affects the racing ability of the child horse and consequently a strong child horse is produced. The "influence occurring probability of the degree of strong-horse production" is a probability that a strong horse is born by the influence of the degree of strong-horse production. The "influence value of the degree of strong-horse production" is a degree that the sire gives the influence of the degree of strong-horse production to its child horse.

Figures 4B, 4C:
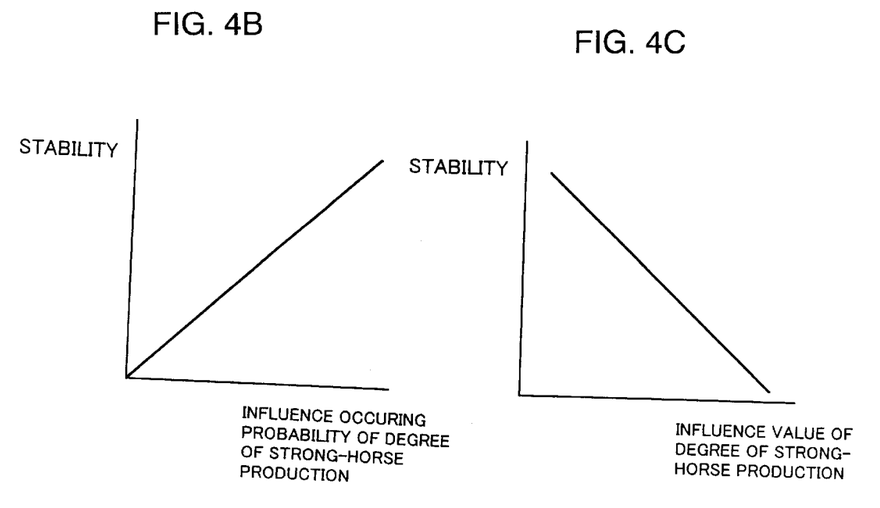
FIGS. 4B and 4C are schematic diagrams showing relation between a stability and degree of strong-horse production.

The influence occurring probability and the influence value of the degree of strong-horse production are associated with the stability of sire. As is shown in FIG. 4B, if the stability of the sire is high, the influence occurring probability of the degree of strong-horse production is high, and if the stability of the sire is low, the influence occurring probability of the sire is low. However, as shown in FIG. 4C, if the stability of the sire is large, the influence value is small when the influence occurs. If the stability of the sire is small, the influence value is large when the influence occurs. Namely, a sire having high stability stably gives its ability to the child horse so that excellent child horses are born with high probability. However, the level of the inheritance is rather average, and there is low probability that an unpredictable outstanding child horse is born. On the contrary, a sire having low stability unstably gives its ability to the child horse and hence excellent child horses are born with low probability. However, a child horse with unpredictable outstanding ability may be occasionally born from a sire having low stability.

Specifically, whether or not the influence of the degree of strong-horse production occurs may be determined as follows. First, a random number $\beta$ is generated. Then, the influence occurring probability of the degree of strong-horse production is obtained by:

(Influence Occurring Probability)=Constant A+(Sire Stability)/ Constant B  (6).

If the influence occurring probability thus obtained is larger than the random number $\beta$, the influence of the degree of strong-horse production occurs, and if the influence occurring probability is smaller than the random number $\beta$, the influence of the degree of strong-horse production does not occur.

In addition, the influence value of the degree of strong-horse production is determined as follows. First, the variation of the sire evaluation value is obtained as the absolute difference between the sire evaluation value and the basic earning index value, namely:

(Variation of sire evaluation value)=|Sire evaluation value−Basic earning index value|  (7).

While the sire evaluation value of user-made sire is obtained from the equation (5) as mentioned above, a basic earning index value is also prepared for each user-made sire. Therefore, the variation may be obtained by the equation (7) even for the user-made sires.

Subsequently, by using the variation thus obtained and the stability of sire, the influence value is obtained as follows:

(Influence value of Degree of strong-horse production)=(Ability Range)×√(Variation/Stability)×Constant C  (8)

Here, the ability range is a range in which a plurality of parameter values defining the racing ability of the child horse can take. For example, in the case where the racing ability of the child horse is defined by four parameters: speed, stamina, quickness and guts, a certain possible numerical range is predetermined for each parameter, and the numerical range is the ability range described here. Therefore, the influence by the degree of strong-horse production is given for each parameter defining the racing ability of the child horse. If the variation of the sire evaluation value by the equation (8) is positive (i.e., the ability of the sire is improving), the influence value of the degree of strong-horse production for each parameter thus obtained is added to the basic ability value obtained in step S8 in FIG. 2B to obtain the corrected ability value. If the variation of the sire evaluation value is negative (i.e., the ability of the sire is getting worse), the influence value of the degree of strong-horse production for each parameter is subtracted from the basic ability value to obtain the corrected ability value.

Figure 7:
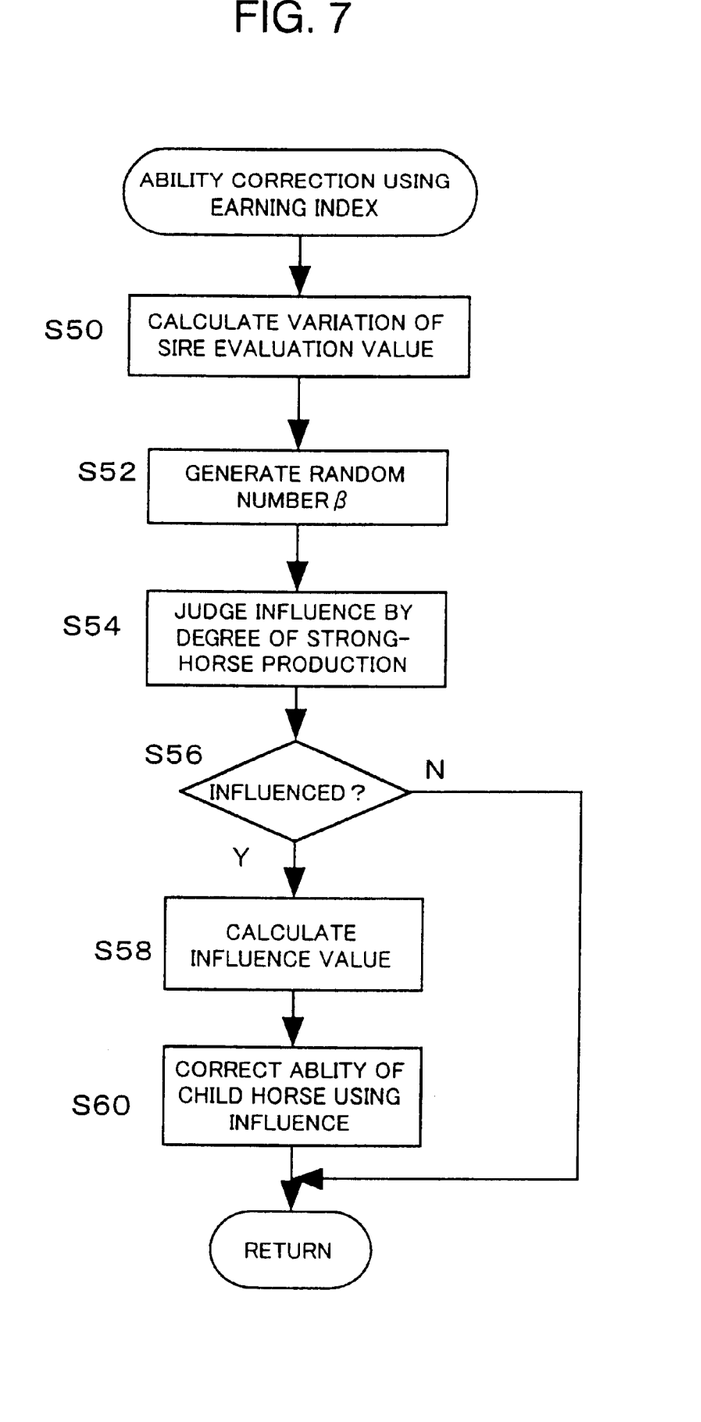
FIG. 7 is a flowchart showing correction step of ability of child horse using an earning index.

Next, by referring to FIG. 7, the description will be given of the ability correction processing of the child horses by using the earning index, corresponding to step S10 in FIG. 2B. First, by the aforementioned equation (7), the variation of the sire evaluation value is calculated (step S50). Then, the random number $\beta$ is generated (step S52). According to the above-mentioned judgement method, it is determined whether the influence by the degree of strong-horse production occurs or not, by using the sire stability and the random number $\beta$ (step S54). If it is determined that the influence occurs (step S56: Yes), then the influence value of the degree of strong-horse production is calculated, according to the equation (8), for each parameter defining the racing ability of the child horses (step S58). Then, based on the absolute value of the variation of the sire evaluation value obtained in step S50, the influence value obtained in step S58 is added to or subtracted from the basic ability value of the child horse obtained in step S8 in FIG. 2B to obtain the corrected ability of the child horse (step S60). Thereafter, the process returns to the horse breeding process in FIG. 2B. On the other hand, if it is determined that the influence of the degree of strong-horse production does not occur (step S56: No), the process immediately returns to the horse breeding process in FIG. 2B.

In this way, the basic ability value of the child horse is corrected based on the earning index value of the sire. Therefore, the ability of the newborn horse varies dependently upon the stability of the sire and the ability variation of the sire at that time, which is represented by the variation of the sire evaluation value. Thus, the user can select the sire in consideration of various factors to enjoy the pleasure of producing strong child horses.

It is noted that the racing ability of the child horse thus determined may be presented to the user by showing the associated information of the child horse. For example, the racing ability of the child horse may be represented for each parameters, i.e., speed, stamina, quickness and guts, in the form of numerical values and/or graphs. Alternatively, by a message or the like given to the user during the game progress, the user may be notified that the child horse has high racing ability.

It is noted that the stability of the sire may be shown in the form of bars representing the ability, within a sire data picture to be displayed to the user for notifying the data associated with each sire. For example, a long ability bar may show the high stability and a short ability bar may show low stability. Further, the sire's ability may be directly presented to the user in the form of numerical values, and furthermore the stability may be notified to the user as a message produced at the time when the user selects the sire.

In the above embodiment, the sire is classified into the pre-existing sire and the user-made sire, and the sire evaluation value for the pre-existing sire is varied every year by using random number. However, the sire evaluation value may be obtained by using the earning index value based on the equation (5) even for the pre-existing sire, similarly to the user-made sire, if the race result data of the child horses exists for that pre-existing sire.

As described above, according to the present invention, the ability of sires are updated year by year, and the mating fee is also updated based on the updated ability of sire. Also, in the updated sire list, in addition to the mating fee, information related to the condition of the sire, e.g., whether the evaluation of the sire is improving or degrading, are presented to the user. Therefore, the user can select the sire in consideration of those various information. Further, since the ability of the sire changes every year, there are many ways to produce strong child horse. Therefore, the user has broad choice in selecting the sire, and this may give pleasure in thinking how to produce strong horses.

For the user-made sires, the evaluation of the sire is updated based on the race result of its child horses, and hence more realistic evaluation of the sire may be achieved. The user can improve the evaluation of the user-made sire and increase the ranking of the user-made sires by improving the race result of the child horses. Thus, the user can feel the pleasure in producing excellent sires in his or her own way.

Further, since the ability of the newborn horse is corrected by using the earning index value, the present ability condition of the sire is reflected to the racing ability of its child horse, and this can achieve more realistic breeding process.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.2000-027326 filed on Jan. 31, 2000 including the specification, claims, drawings and summary is incorporated herein by reference in its entirety.

What is claimed is:

1. A game system comprising:

a display device for displaying images;

an input device for receiving manipulation by a user and for outputting a signal corresponding to the manipulation; and a control device for controlling progress of a horse breeding game with monitoring the signal outputted from the input device and displaying images corresponding to the progress of the game on a screen of the display device, the control device comprising:

an evaluation value storage means for storing evaluation values for a plurality of sires;

a control means for controlling the progress of the game based on the evaluation values;

an evaluation value updating means for updating the evaluation values for the sires in every predetermined period during the progress of the game;

a sire designation for receiving a designation of the sire by the user;

a child horse ability determining means for determining a basic ability value of the child horse based on pedigree data of the sire designated by the sire designating means; and a child horse ability correcting means for correcting the basic ability value of the child horse for the designated sire based on variation amount of the updated evaluation value, wherein the child horse ability correcting means corrects the ability by increasing the ability of the child horse if the variation amount of the evaluation value is positive and decreasing the ability of the child horse if the variation amount of the evaluation value is negative.

2. A game system according to claim 1, wherein the control device further comprises:

a mating fee determining means for determining a mating fee for each sire based on the updated evaluation value; and a sire list producing means for producing a sire list including indication of the mating fees for all sires determined by the mating fee determining means and for displaying the sire list on the display device.

3. A game system according to claim 2, wherein the control device further comprises a variation tendency determining means for determining variation tendency of the evaluation value for each sire based on the variation amount of the evaluation value caused by the updating, and wherein the sire list producing means produces the sire list which represents sire names, the mating fees and the variation tendency of the evaluation value in an order sorted in terms of the mating fee.

4. A game system according to claim 1, wherein the evaluation value updating means updates the evaluation value by adding a predetermined reference value for the sire to a correction value generated using a random number.

5. A game system according to claim 4, wherein the correction value is determined by arithmetically operating a variation range value and a variation probability value predetermined for the sire and the random number.

6. A game system according to claim 1, wherein the control device further comprises a race result data storage means for storing race result data of the child horse for each sire, and wherein the evaluation value updating means updates the evaluation value of the sire based on the race result data of the child horse.

7. A game system according to claim 1, wherein the control device further comprises a stability storage means for storing a predetermined stability for each sire, and wherein the child horse ability correcting means varies a ratio, with which the ability of the child horse depends on the variation amount of the evaluation value, in accordance with the stability of a selected site.

8. A computer readable storage medium for carrying a program for controlling progress of a horse breeding game with monitoring a signal outputted from an input device of a game system and displaying images corresponding to the progress of the game on a screen of the display device, the program controls the game system to function as:

an evaluation value storage means for storing evaluation values for a plurality of sires;

a control means for controlling the progress of the game based on the evaluation values;

an evaluation value updating means for updating the evaluation values for the sires in every predetermined period during the progress of the game;

a sire designating means for receiving a designation of the sire by the user;

a child horse ability determining means for determining a basic ability value of a child horse based on pedigree data of the sire designated by the sire designating means; and a child horse ability correcting means for correcting the basic ability value of the child horse for the designated sire based on variation amount of the updated evaluation value, wherein the child horse ability correcting means corrects the ability by increasing the ability of the child horse if the variation amount of the evaluation value is positive and decreasing the ability of the child horse if the variation amount of the evaluation value is negative.

9. A game system comprising:

a display device for displaying images;

an input device for receiving manipulation by a user and for outputting a signal corresponding to the manipulation; and a control device for controlling progress of a horse breeding game with monitoring the signal outputted from the input device and displaying images corresponding to the progress of the game on a screen of the display device, the control device including:

an evaluation value storage means for storing evaluation values for a plurality of sires;

a control means for controlling the progress if the game based on the evaluation values; and an evaluation value updating means for updating the evaluation values for the sires in every predetermined period during the progress of the game;

a sire designation means for receiving a designation of the sire by the user;

a child horse ability determining means for determining a basic ability value of a child horse based on pedigree of the sire designated by the sire designating means; and a child horse ability correcting means for correcting the basic ability value of the child horse for the designated sire based on variation amount of the updated evaluation value, wherein the child horse ability correcting means corrects the ability by increasing the ability of the child horse if the variation amount of the evaluation value is positive and decreasing the ability of the child horse if the variation amount of the evaluation value is negative, and the control device includes a race result data storage means for storing race result data of the child horse for each sire, and wherein the evaluation value updating means updates the evaluation value of the sire based on the race result data of the child horse.

10. A game system according to claim 9, wherein the control device further comprises:

a mating fee determining means for determining a mating fee for each sire based on the updated evaluation value; and a sire list producing means for producing a sire list including indication of the mating fees for all sires determined by the mating fee determining means and for displaying the sire list on the display device.

11. A game system according to claim 10, wherein the control device further comprises a variation tendency determining means for determining variation tendency of the evaluation value for each sire based on the variation amount of the evaluation value caused by the updating, and wherein the sire list producing means produces the sire list which represents sire names, the mating fees and the variation tendency of the evaluation value in an order sorted in terms of the mating fee.

12. A game system according to claim 9, wherein the evaluation value updating means updates the evaluation value by adding a predetermined reference value for the sire to a correction value generated using a random number.

13. A game system according to claim 12, wherein the correction value is determined by arithmetically operating a variation range value and a variation probability value predetermined for the sire and the random number.

14. A game system according to claim 9, wherein the control device further comprises a stability storage means for storing a predetermined stability for each sire, and wherein the child horse ability correcting means varies a ratio, with which the ability of the child horse depends on the variation amount of the evaluation value, in accordance with the stability of a selected sire.

* * * * *